Jan. 7, 1930.  B. S. MOORE  1,742,271
RETAINER
Filed Aug. 29, 1927  2 Sheets-Sheet 1

INVENTOR.
Benjamin S. Moore
BY
Edward N. Pagelsen,
ATTORNEY.

Jan. 7, 1930.   B. S. MOORE   1,742,271
RETAINER
Filed Aug. 29, 1927   2 Sheets-Sheet 2
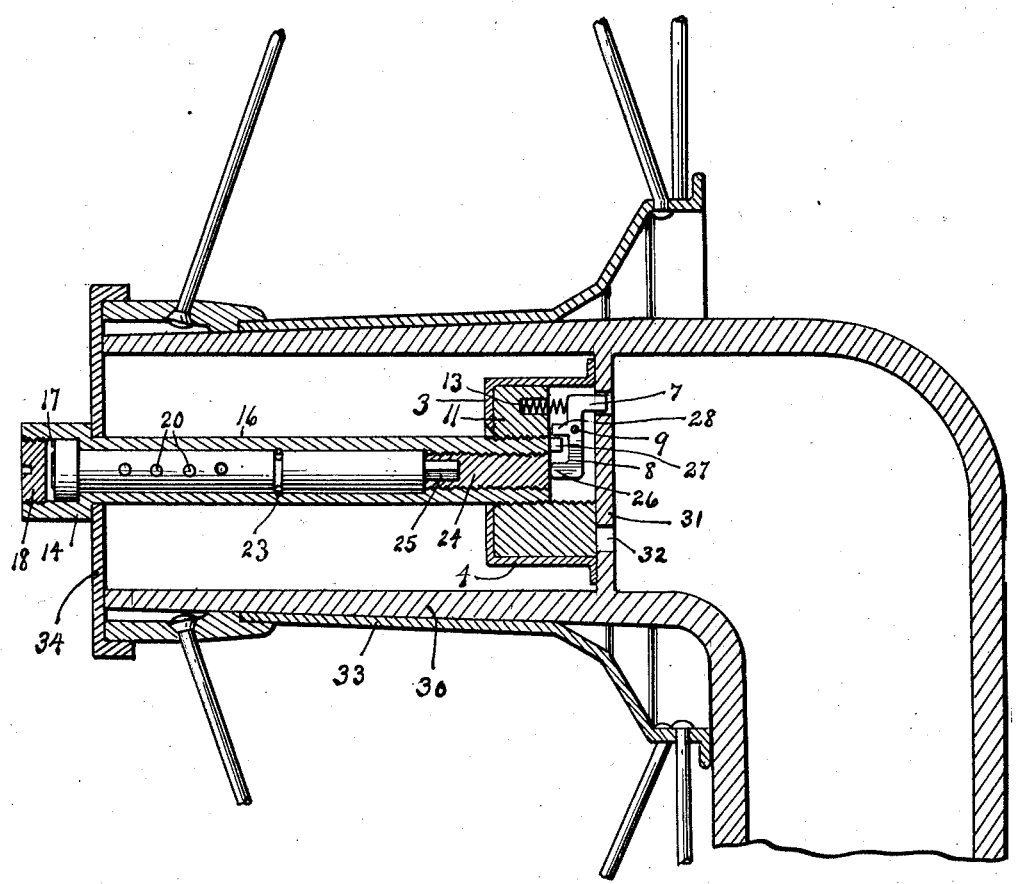
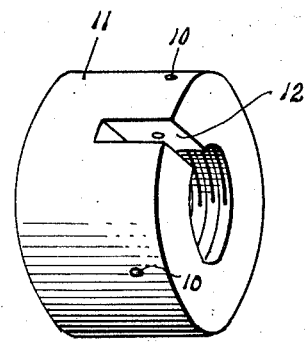
INVENTOR.
Benjamin S. Moore
BY Edward N. Pagelsen
ATTORNEY.

Patented Jan. 7, 1930

1,742,271

UNITED STATES PATENT OFFICE

BENJAMIN S. MOORE, OF DETROIT, MICHIGAN

RETAINER

Application filed August 29, 1927. Serial No. 216,113.

This invention relates to means for retaining or securing removable rims of automobile wheels on wheel fellys or on tire carriers, for securing demountable wheels of automobiles on carriers, and for securely attaching any other demountable members to fixed carriers, and its object is to provide a device of this character wherein a key operated lock controls the relative movement between a retaining bolt and its nut.

This invention consists in a case or body and a nut adapted to rotate therein, a retaining bolt adapted to screw into the nut, and means controlled by a key operated lock for determining whether the nut shall turn with the bolt or shall be stationary relative thereto.

It also consists in so forming a tubular bolt as to adapt it to receive a cylindrical lock, and in providing a dog or latch movably carried by the nut and adapted to be positioned by the lock to engage either the bolt or the case, to lock the nut to the bolt or case.

It further consists of the details of construction illustrated in the accompanying drawings and particularly pointed out in the claims.

Figure 1:
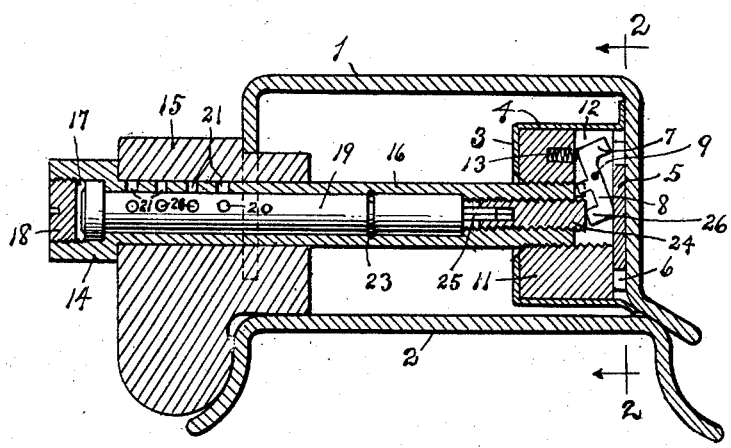
Figure 2:
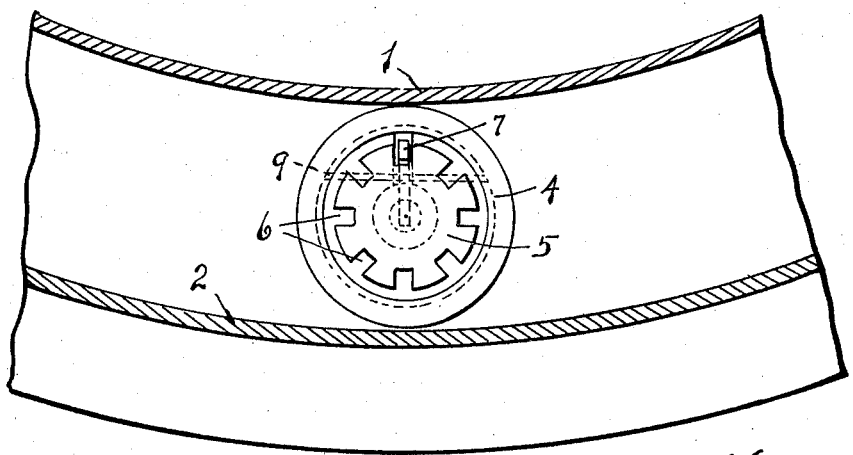

In the drawing; Fig. 1 is a transverse section of a rim lock for a tire carrier. Fig. 2 is a section on the line 2—2 of Fig. 1. Fig. 3 is a central section of a carrier for demountable wheels equipped with the present retainer. Fig. 4 is a perspective view of the nut.

Similar reference characters refer to like parts throughout the several views.

The part 1 in Figs. 1 and 2 may be a tire carrier or a wheel felly adapted to receive the demountable rim 2. Within and attached to the part 1 is a case 4, preferably a cylinder, having an annular end 3. Attached to the member 1 is a disk 5 having notches 6 of any desired number adapted to receive the outer arm 7 of a dog 8 pivoted on a pin 9 extending through the holes 10 in the nut 11, and mounted within a radial slot 12 in this nut. A spring 13 mounted in a recess in this nut tends to move the arm 7 into a notch in the disk 5. The case 4, the disk 5 and the part 1 may be considered as the body of this retainer.

Any desired clamp 15 may be used to hold the rim on the carrier and this clamp is perforated to receive a tubular bolt 16 whose inner end is threaded to fit the nut. The outer end or head 14 is preferably formed with a threaded counterbore 17 to receive the cap 18. Within the bolt is a cylindrical lock 19 whose tumblers 20 are adapted to enter notches 21 in the bolt, but which may be withdrawn by the insertion of a key (not shown) so the lock may be freely turned. A spring ring 23 prevents removal of the lock. The inner end of the bore of the bolt 16 is threaded to receive a screw plug 24 which is slidable on a pin 25 extending from the lock and may be turned thereby. The projecting end of this plug is engaged by an arm 26 on the dog 8. The bolt and dog are so formed that when the plug is extended from the bolt, as shown in Fig. 1, the dog and bolt engage. One form of this engagement may be provided by the finger 27 on the bolt and the finger 28 on the dog. (See Fig. 3.)

In Fig. 1, these fingers are in engagement and rotation of the bolt will cause rotation of the nut and therefore no release of the clamp. But should the lock body 19 be rotated within the bolt sufficiently to screw in the plug 24 to the position shown in Fig. 3, the spring 13 will push the arm 7 of the dog 8 into one of the notches 6 and thus prevent the nut from turning within the body or case 4. The bolt may now be screwed out of the nut to release the clamp 15. As the clamp and bolt may be be made of hard steel, this lock cannot be destroyed very readily and is therefore well adapted to prevent theft of the rim and the tire protected thereby.

In Fig. 3, I have shown this retainer adapted to a support for demountable wheels. The tubular support 30 is provided with a diaphragm 31 formed with notches or holes 32 to receive the arm 7 on the dog 8 and the case or body 4 is attached to this diaphragm. The hub 33 of the wheel is held on this support by a holding member 34 of any desired construction but preferably of hard steel. It cannot be removed without unscrewing the bolt and so long as the nut 11 must rotate with the bolt by reason of the engagement of the fingers 27 and 28, this removal of the bolt and holding member is impossible. The dog cannot be released from the bolt except by the rotation of the lock through the use of the key for which this lock is adapted.

Many changes in the details of construction of this lock and its adaptation to other uses may be made by those skilled in the art without departing from the spirit of my invention as set forth in the following claims.

I claim:

1. In a retainer, the combination of a body, a rotatable nut mounted therein, a bolt adapted to screw into said nut, a key actuated lock, and means carried by the nut and adapted to engage the body or the bolt to connect the nut to the body or to the bolt, said means being controlled by said lock.

2. In a retainer, the combination of a body, a rotatable nut mounted in the body, a tubular bolt adapted to screw into said nut, a key operated lock rotatable within the bolt, and means movably mounted on the nut and positioned by said lock to compel or prevent the rotation of said nut relative to the bolt.

3. In a retainer, the combination of a body, a rotatable nut mounted in the body, a tubular bolt adapted to screw into said nut, a key operated lock rotatable within the bolt, a dog carried by the nut and adapted to engage the body or the bolt to prevent or compel rotation of the nut by the bolt, and means actuated by the rotation of the lock within the bolt to control the position of said dog.

4. In a retainer, the combination of a body, a rotatable nut mounted therein, a bolt adapted to screw into said nut, a lock, and a dog pivoted on the nut and adapted to swing to engage the body or the bolt to connect the nut to the body or to the bolt, the position of said dog being controlled by said lock.

5. In a retainer, the combination of a cylindrical body, a rotatable cylindrical nut mounted therein, a tubular bolt adapted to screw into said nut and having an internally threaded inner end, a plug threaded in said end, a lock rotatably mounted in said bolt and adapted to turn said plug to cause it to move longitudinally of the bolt, a dog pivotally carried by the nut and adapted to engage the bolt to cause the nut to turn with the bolt and to engage the body to prevent the nut from rotating, the position of the dog being controlled by said plug.

BENJAMIN S. MOORE.